F. C. REINEKING.
REED AIR INTAKE REGULATOR FOR CARBURETERS.
APPLICATION FILED APR. 13, 1909.
943,996.
Patented Dec. 21, 1909.
3 SHEETS—SHEET 1.
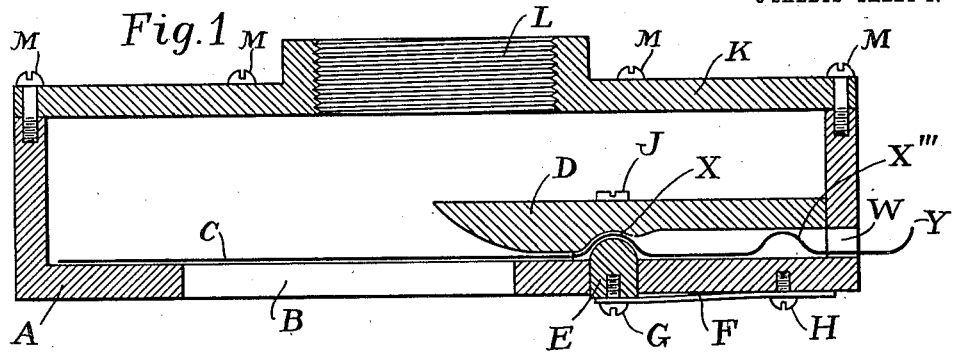
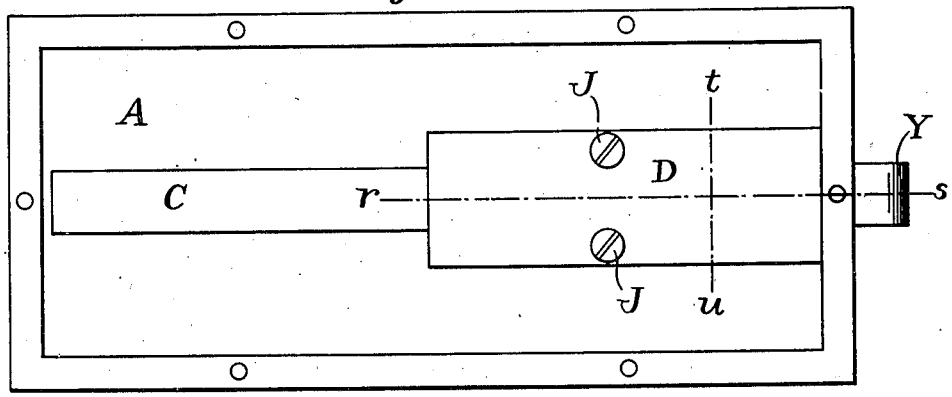
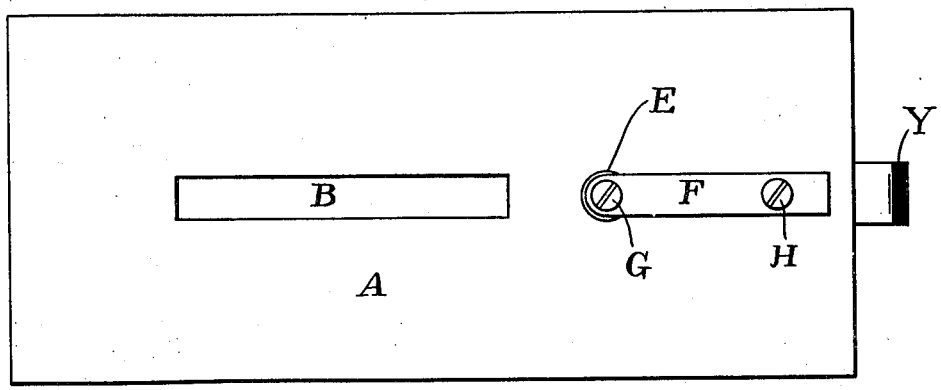
WITNESSES:
David J. Walsh
Walter A. Craft.
INVENTOR
Frederick C. Reineking
BY
C. Andrade Jr.
ATTORNEY F. C. REINEKING.
REED AIR INTAKE REGULATOR FOR CARBURETERS.
APPLICATION FILED APR. 13, 1909.
943,996.
Patented Dec. 21, 1909.
3 SHEETS—SHEET 2.
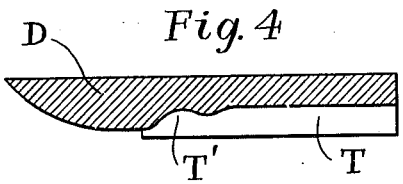
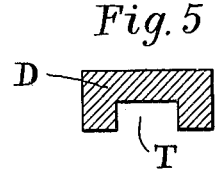
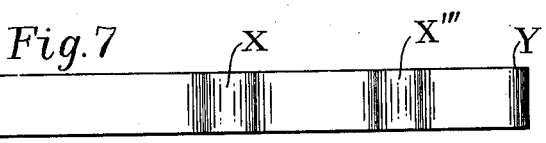
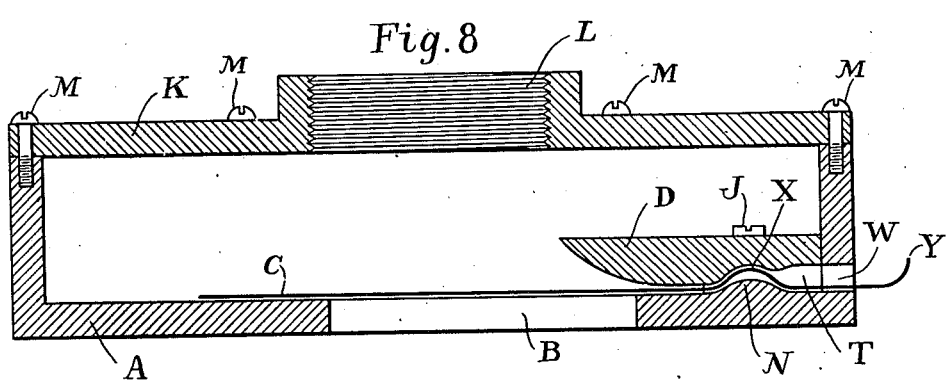
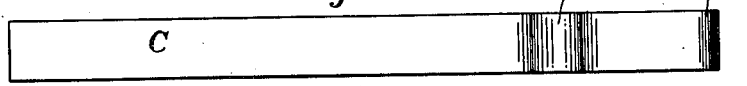
WITNESSES:
David J. Walsh
Walter A. Craft.
INVENTOR
Frederick C. Reineking
BY
C. Andrade Jr.
ATTORNEY F. C. REINEKING.
REED AIR INTAKE REGULATOR FOR CARBURETERS.
APPLICATION FILED APR. 13, 1909.
943,996.
Patented Dec. 21, 1909.
3 SHEETS—SHEET 3.
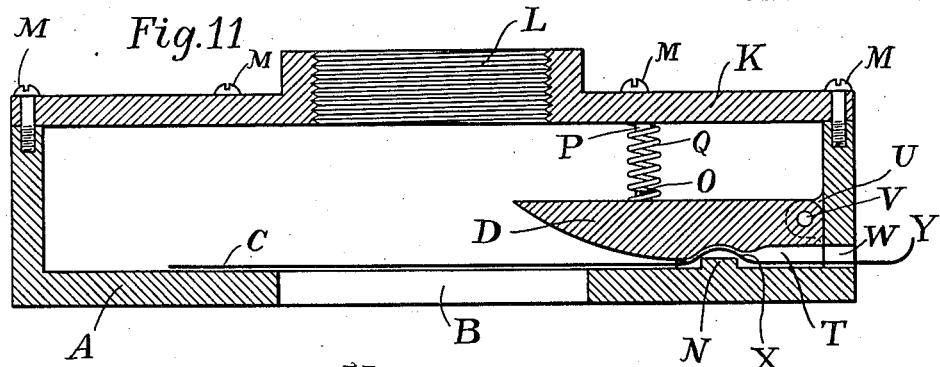
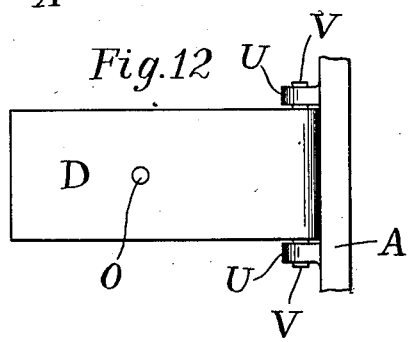
WITNESSES:
David J. Walsh
Walter A. Craft.
INVENTOR
Frederick C. Reineking
BY
C. Andrade Jr.
ATTORNEY

UNITED STATES PATENT OFFICE.

FREDERICK C. REINEKING, OF JERSEY CITY, NEW JERSEY.

REED AIR-INTAKE REGULATOR FOR CARBURETERS.

943,996.

Specification of Letters Patent.

Patented Dec. 21, 1909.

Application filed April 13, 1909. Serial No. 489,646.

*To all whom it may concern:*

Be it known that I, FREDERICK C. REINE-KING, a citizen of the United States, residing at 34 Lembeck avenue, in Jersey City, county of Hudson, and State of New Jersey, have invented a new and useful Improvement in Reed Air-Intake Regulators for Carbureters, of which the following is a specification.

My invention relates to an improvement in reed air intake regulators for carbureters; and the objects of my invention are, first to provide means for a regulation of the reed tension which shall make the air regulation more efficient at all engine speeds, second to provide means for readily changing and renewing the reeds without the use of tools; and third to provide for greater durability and wearing qualities of the reeds. I attain these objects by the mechanism illustrated in the accompanying drawings, in which—

Figure 1 is a section in elevation of my device, Fig. 2 is a plan view of my device viewed from above, Fig. 3 is a plan view of my device viewed from below, Fig. 4 is a detail section in longitudinal elevation of a stop used in my device, Fig. 5 is a detail transverse section of said stop, Fig. 6 is a detail side view of one form of my improved reed, Fig. 7 is a detail plan view of the same reed as shown in Fig. 6, Fig. 8 is a section in elevation of another form of my device, Fig. 9 is a detail side view of the reed shown in Fig. 8, Fig. 10 is a detail plan view of the same reed shown in Fig. 9, Fig. 11 is a section in elevation of still a third form of my device. Fig. 12 is a top detail view of the stop shown in Fig. 11.

Fig. 1 is a longitudinal section in elevation of my device. A is the casing or wall of the air intake chamber. B is the air intake slot in casing A. C is the reed. X is a small bend in reed C. X''' is a similar bend in reed C. Y is a turn in the end of reed C. E is a pin with rounded head free to play up and down in casing A and registering with bend X in reed C. F is a spring fastened to pin E by screw G, and fastened to casing A by screw H. D is a stop fastened to casing A by screws J (the head of only one of these screws appears in Fig. 1, they are both shown in Fig. 2). W is a slot in the wall of casing A of the same transverse dimension as slot T in stop D (Fig. 5). K is a cover fastened to casing A by screws M. L is an air connection leading to the mixing chamber of the carbureter or to the intake pipe of the engine.

Fig. 2 is a plan view of my device viewed from above. A is the casing. C is the reed. D is the stop. J J are the screws which fasten stop D to casing A. Y is the bend in the end of reed C. The dotted lines $t\ u$ and $r\ s$ are lines of reference as will be explained later on.

Fig. 3 is a plan view of my device viewed from below. A is the casing, B is the air intake slot, E is the movable pin, F is the spring, G is the screw which fastens spring F to movable pin E. H is the screw which fastens spring F to casing A. Y is the bend in the end of reed C.

Fig. 4 is a detail section in longitudinal elevation of the stop D taken on the line $r\ s$ (Fig. 2). T is a slot in the bottom of stop D. This slot is a trifle wider than the reed C. The top of the slot has a recess T' which registers with the bend X in reed C.

Fig. 5 is a detail transverse section of the stop D taken on the line $t\ u$ (Fig. 1). T is the slot. Slot T is of such width and height as will permit reed C with bends X and X' (Figs. 1, 6, 7) to be passed through it.

Fig. 6 is a detail side view of the reed C shown in Figs. 1 and 2. C is the reed, and X is the bend in reed C. Bend X fits into recess T' (Fig. 4). Bend X''' bears against the top of slot T, and gives stability and firmness to reed C when it is in place. Y is a bend in the end of reed C, to be used as a handle in removing and inserting the reed.

Fig. 7 is a detail plan view of the reed shown in Fig. 6. X and X''' are the bends that go into slot T (Figs. 4 and 5). Y is the bend forming a handle at the end of reed C.

Fig. 8 is a longitudinal section in elevation of another form of my device. A is the casing. B is the air intake slot. C is the reed. X is a bend in reed C. Y is a bend in the end of reed C. N is a lug on casing A to register with bend X in reed C. D is a stop fastened to casing A by screws J (as in Fig. 1). W is a slot in casing A, said slot being of the same transverse dimensions as slot T in stop D. K is a top fastened to casing A by screws M. L is an air connection leading to the mixing chamber of the carbureter or to the intake pipe of the engine.

Fig. 9 is a detail side view of the form of reed shown in Fig. 8. C is the reed, X is the bend in reed C, Y is the bend in the end of reed C.

Fig. 10 is a detail side view of the reed shown in Fig. 8. C is the reed. X is the bend in the reed. Y is the bend in the end of the reed.

Fig. 11 is another form of my device. A is the casing. B is the air intake slot. N is the lug on casing A, to register with bend X in reed C. D is the stop. W is a slot in casing A of the same transverse dimensions as slot T in stop D. U is a hinge lug integral with casing A. V is a pin on the stop D. Y is a bend on the end of reed C. O is a small lug on the top of stop D. The function of lug O is to fix the lower end of coil spring Q. K is a top fastened to casing A by screws M. L is an air connection leading to the mixing chamber of the carbureter or to the intake pipe of the engine. P is a lug on the bottom of cover K. The function of lug P is to fasten the upper end of coil spring Q.

Fig. 12 is a detail top view of the stop shown in Fig. 11. D is the stop. O is the lug on top of D. U are the lugs integral with casing A. V are the ends of the hinge pin, which runs through the corner of stop D, permitting stop D to rotate about pin V as an axis.

The operation of the device is as follows: Experience has shown that for purposes of adjustment, the reeds on intake regulators require frequent changes before exactly the right reed is found. This makes it desirable to have an arrangement which will permit of the easy withdrawal and insertion of the reeds. I accomplish this in the various manners shown. For example, in the form of my device shown in Fig. 1, the movable pin E holds the reed C in position by pressing into the hollow of bend X. In the form of my device shown in Fig. 8, the tension of the bend X holds the reed C in position against lug N. In the form of my device shown in Fig. 11, the tension of coil spring Q presses stop D down onto bend X of reed C, and forces bend X down into position on lug N. When the device is in operation there is no end pressure on reed C, and therefore bend X acting either on pin E (Fig. 1) or lug N (Figs. 8 and 11) holds the reed rigid in a longitudinal direction, while the sides of reed C bearing against the sides of slots T and W (Figs. 1, 8, 11) prevent any lateral motion of reed C. When it is desired to remove reed C, the operator grasps the bend Y on the end of reed C, and pulls the reed C out through the slots T and W, and inserts a new reed into slot W and pushes it into place, the various spring devices shown cause the bend X to remain at the place occupied by the movable pin E (Fig. 1) or the lug N (Figs. 8 and 11). Indeed in Fig. 8 the necessary spring action for this function is derived from the elasticity of reed C itself.

I claim as my invention:

1. In reed air intake regulators for carbureters; in combination, a casing, said casing being pierced by an air intake slot; a removable reed coöperating with said slot, said reed having a flexible bent portion near its fixed end; a stop over the fixed end of said reed, said stop being slotted on its lower face to register with the sides of said reed, and holding said reed in alinement with said air intake slot; a lug on said casing acting in conjunction with said flexible bent portion of said reed for holding said reed in place longitudinally.

2. In reed air intake regulators for carbureters; in combination, a casing, said casing being pierced by an air intake slot; a removable reed coöperating with said slot, said reed having a bent portion near its fixed end; a stop over the fixed end of said reed, said stop being slotted on its lower face to register with the sides of said reed and holding said reed in alinement with said air intake slot; automatic spring means acting in conjunction with said bent portion of the reed for holding said reed in place longitudinally.

FREDERICK C. REINEKING.

Witnesses:
ADOLPH WIDDER,
ARTHUR C. JOHNSON.